United States Patent [19]

Ljung et al.

[11] Patent Number: 4,561,780
[45] Date of Patent: Dec. 31, 1985

[54] PATHLENGTH CONTROLLER FOR RING LASER GYROSCOPE

[75] Inventors: Bo H. G. Ljung, Wayne; Hyman Cohen, Fairlawn, both of N.J.

[73] Assignee: The Singer Company, Little Falls, N.J.

[21] Appl. No.: 144,701

[22] Filed: Apr. 28, 1980

[51] Int. Cl.$^4$ .............................................. G01C 19/64
[52] U.S. Cl. ................................................... 356/350
[58] Field of Search ................. 356/350; 331/94.5 S, 331/94.5 T, 94.5 ML, 17; 310/314–317, 322; 330/75, 96, 135, 141; 307/317; 328/127–128, 226; 318/626, 640; 329/117

[56] References Cited

U.S. PATENT DOCUMENTS 3,048,336  8/1972  Ritzenthaler ........................ 328/127
3,902,053  8/1975  Figueroa ............................. 328/127
4,160,184  7/1979  Ljung .................................. 356/350
4,267,478  5/1981  Ljung et al. ........................ 356/350

OTHER PUBLICATIONS

Shotton et al., "An Electronic Servocontrol for Stabilized Lasers & Similar Applications", National Physical Laboratory, Teddington, England, NPL Report QU 28, 1–1975.

Primary Examiner—William H. Punter
Attorney, Agent, or Firm—Thomas W. Kennedy

[57] ABSTRACT

A pathlength controller for a ring laser gyroscope with a modulated mirror is disclosed where a voltage bias is applied to the modulation signal to prevent starting the ring laser gyroscope at a point where it operates with two equal longitudinal modes.

1 Claim, 3 Drawing Figures

DEMODULATOR OUTPUT VS. PLC
TRANSDUCER VOLTAGE

PATHLENGTH CONTROLLER FOR RING LASER GYROSCOPE

BACKGROUND OF THE INVENTION

This invention relates to ring laser gyroscopes in general, and more particularly, to an improved pathlength controller for a ring laser gyroscope.

A ring laser gyro, as its name applies, is a gyroscope which utilizes a laser beam directed to travel in a closed path, e.g., a ring, to detect rotation about the axis of the path around which the laser beam is directed. Typical ring laser gyroscopes are disclosed in U.S. Pat. Nos. 3,373,650 and 3,467,472.

As disclosed in U.S. Pat. No. 4,160,184, the pathlength in a ring laser gyroscope must be closely controlled in order to maintain a constant scale factor and bias. This is usually accomplished both by the use of ultra-low expansion materials and by an active pathlength controller. Such a pathlength controller is disclosed in the aforementioned U.S. Pat. No. 4,160,184 in the form of a piezoelectric actuator.

In order for the ring laser gyroscope to operate with a very small drift and bias it is necessary to utilize an optical cavity with very small losses in the order of 300 ppm. Such a cavity lases with a quite low excitation current. It turns out that although this type of ring laser gyroscope operates with a single longitudinal mode in the absence of a rotational input when the pathlength is adjusted to the center of the lasing gain curve, the ring laser gyroscope will exhibit two or more longitudinal modes when the pathlength is adjusted away from the center of the lasing gain curve.

It is impossible to reduce the gain of such a high quality ring laser gyroscope by reducing the plasma excitation current, because the instrument is normally operated at a current level close to the critical dropout level, where the plasma extinguishes.

The servo loop controlling the pathlength utilizes a flexible mirror, attached to one corner of the ring laser gyroscopes, driven by a piezoelectric transducer. This transducer, when vibrated slightly at a known frequency, causes a frequency modulation of the ring laser gyroscope. If the laser is operated slightly off the peak of the laser gain curve, this frequency modulation also causes the ring laser gyroscope's laser intensity to be amplitude modulated. By demodulating, a direct current signal is obtained, which is used to control the transducer's position in order to restore the path length to the center of the laser gain curve.

This scheme works well for a ring laser gyroscope with relatively lossy cavity, that operates with a single longitudinal mode regardless of mistuning. However, when used with a ring laser gyroscope with a very low loss cavity that has more than one longitudinal mode, the path length controller will tune the ring laser gyroscope correctly only at some of the occasions when the ring laser gyroscope is turned on. In about one third of the occasions, when the ring laser gyroscope is turned on, the path length controller will tune such that two equal longitudinal modes are obtained. When this happens the ring laser gyroscope will not work at all. Because this is a stable and predictable operation of the servo, the only remedy available in prior art instruments was to turn the instrument off then on again.

More specifically, the prior art pathlength control system is shown on FIG. 1. It corresponds to the system described in conjunction with FIG. 6 of the aforementioned U.S. Pat. No. 4,160,184. In this system, an oscillator 14, typically operating at 2 KHz, provides one input to a high voltage amplifier 15 which drives a pathlength transducer, e.g., a piezoelectric transducer 13 having mounted to it a flexible mirror 12. The mirror 12 is shown forming, with a two fixed mirrors 10 and 11 respectively a triangular path for the laser beam. The basic purpose of the high voltage amplifier 15 is the supply of voltage to the transducer 13 which will maintain the proper pathlength. Impressed upon this voltage, which is a DC voltage, is a small AC voltage obtained because of the input from the oscillator 14. This causes the flexible mirror to vibrate slightly and to frequency modulate the laser beam 16. If the laser is tuned slightly off the center of the gain curve, an amplitude modulation also results. This amplitude modulation is detected by two detectors 17 and 18 which are disposed to detect the portions of the beam which are transmitted through the mirror 11 (as with any mirror, a small amount of light is transmitted and this transmitted light is what is detected by these detectors). Their outputs are summed and amplified in an operational amplifier 19, and then fed to a bandpass filter 20, the output of which is the input to a demodulator 21 having as a reference input the output of the oscillator 14. As a result, the output on line 22 from the demodulator will contain only the amplitude modulation and not the frequency of the oscillator, i.e., the 2 KHz signal. The demodulated voltage is then fed to an integrator 23 comprising an operational amplifier with an input resistor 25 and a capacitor 24 in its feedback path. This constitutes a closed loop servo system and the integrator 23 will integrate up and down until it reaches the desired operating point with the proper pathlength.

If one opened the servo loop and looked at the output of the demodulator 22 it would appear as shown on FIG. 2. The curve shown on FIG. 2 result from tuning through the single longitudinal modes and from tuning through the modes where the cavity has two equal longitudinal modes. The zero cross-overs marked with circles 40 represent tuning to a single longitudinal mode and the zero cross-overs 41 indicated by the x's represent tuning at points where there are two equal longitudinal modes. Note that the amplitude associated with the single longitudinal mode is considerably greater than the associated with the two longitudinal modes. Proper operation occurs only if the system is tuned to one of the zero cross-overs 40 corresponding to the single longitudinal mode. Thus, as noted above it can be seen that it is possible for the servo loop to null at either one of the points 40 or 41 in this circuit of the prior art.

Quite clearly a mode of operation in which one must turn the gyro on and off until operation in the proper mode occurs is not desirable, particularly if the ring laser gyroscope is to be used in a navigational system. It is thus apparent that there is a need for a simple and effective manner of improving the servo loop so that it will always tune the ring laser gyroscope to the center of the gain curve, i.e., so that it will always tune to one of the proper zero crossovers 40 of FIG. 2.

SUMMARY OF THE INVENTION

The present invention provides a particularly simple and effective arrangement which accomplishes this. In essence, this is done by applying, during start up, a bias to the integrator which biases the integrator to a point below the maximum amplitude of the amplitude modulation caused by operation where there are two equal longitudinal modes. By so biasing the integrator, the only zero crossovers which will occur are zero crossovers corresponding to operation in the single longitudinal mode, i.e., at the center of the gain curve and the gyroscope will always lock in at the proper point.

In the illustrated embodiment the bias is obtained by coupling an offset voltage to the input of the integrator, the offset voltage being coupled through a capacitor and resistor. The value of the offset voltage and the time constant of the RC circuit made up of the resistor and capacitor is selected such that a bias which is greater than the maximum amplitude deviation caused by operation in which there are two equal longitudinal modes exists for a time period sufficient to achieve lock-in.

DETAILED DESCRIPTION OF THE INVENTION

Figure 1:
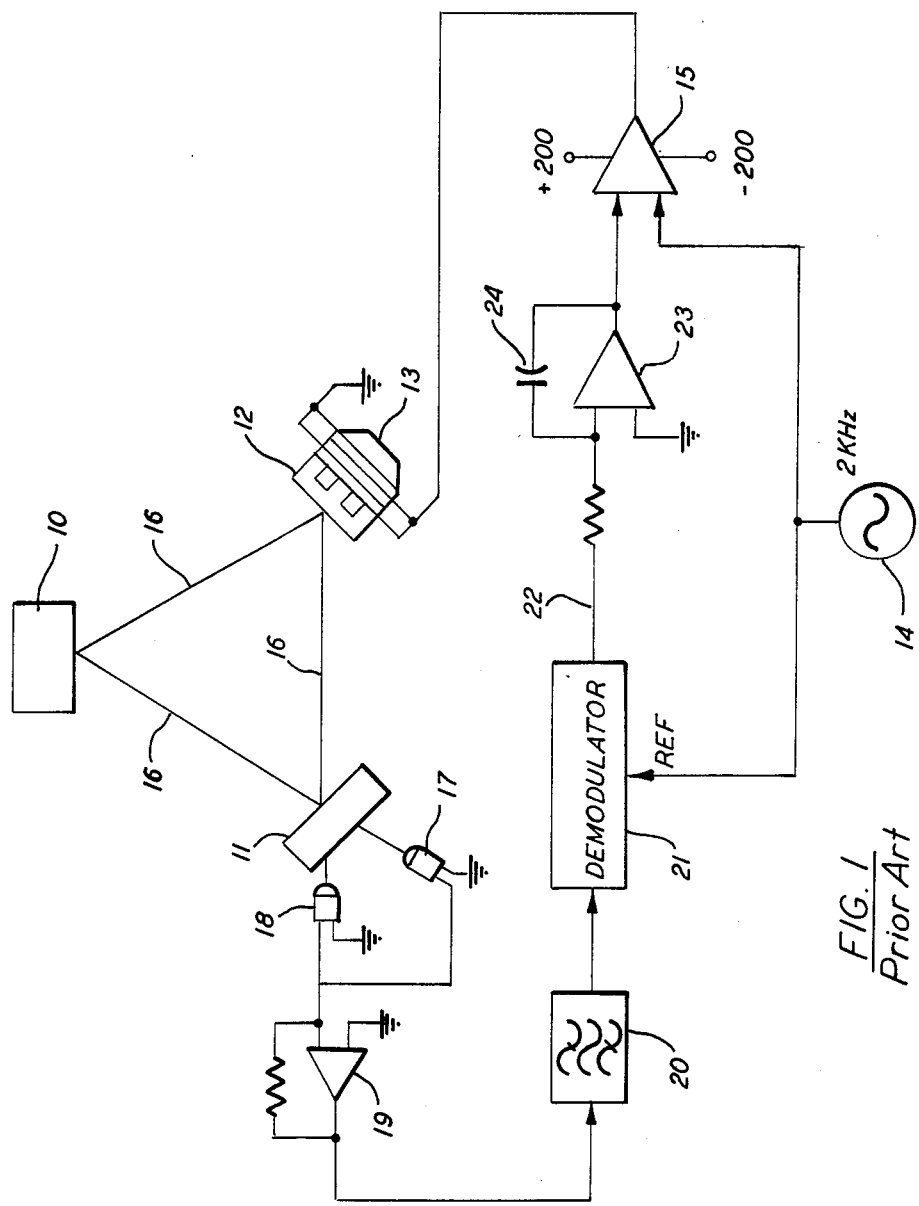
FIG. 1 is a block-circuit diagram of a prior art pathlength control servo loop.
Figure 3:
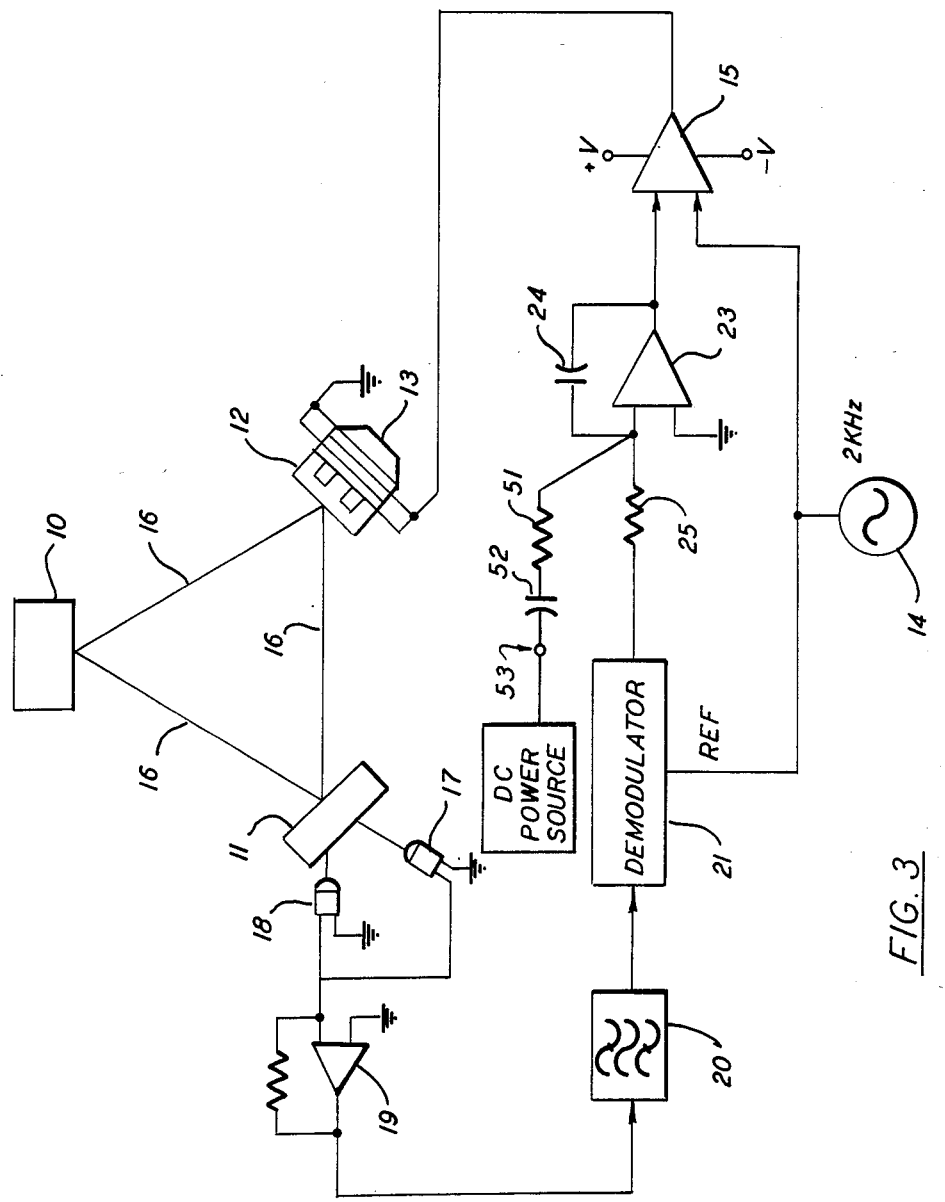
FIG. 3 is a circuit-block diagram of the improved pathlength control servo loop of the present invention.

FIG. 3 illustrates a servo loop according to the present invention. In large degree, this circuit corresponds to the circuit described above in connection with FIG. 1. Thus, there is an oscillator 14 which provides an input to the high voltage amplifier 15 to cause the mirror 12 attached a piezoelectric transducer 13 to vibrate. Once again, the fixed mirrors 10 and 11 and the mirror 12 form a triangular beam path 16. As previously described, the detectors 17 and 18 detect the resulting amplitude modulation which is then amplified in an amplifier 19, filtered in a filter 20 and demodulated in the demodulator 21. Once again, the output of the demodulator is shown being fed to an integrator 23 having a feedback capacitor 24 and an input resistor 25.

However, in accordance with the present invention, a positive offset voltage is also coupled into the input of the integrator 23. The offset voltage, which will typically be 15 volts, is coupled to a terminal 53 which is connected to one side of a capacitor 52, the other side of which is connected to a resistor 51. The other side of the resistor 51 is connected to the input of integrator 23. In a typical circuit, the capacitor will have a value of 0.2 microfarads the resistor 51 at a value of 66 Mohm, the resistor 25 a value of 10 Mohm and the capacitor 24 value of 0.47 microfarads. The amplifier 15 will typically have supply voltages of plus and minus 200 volts.

Figure 2:
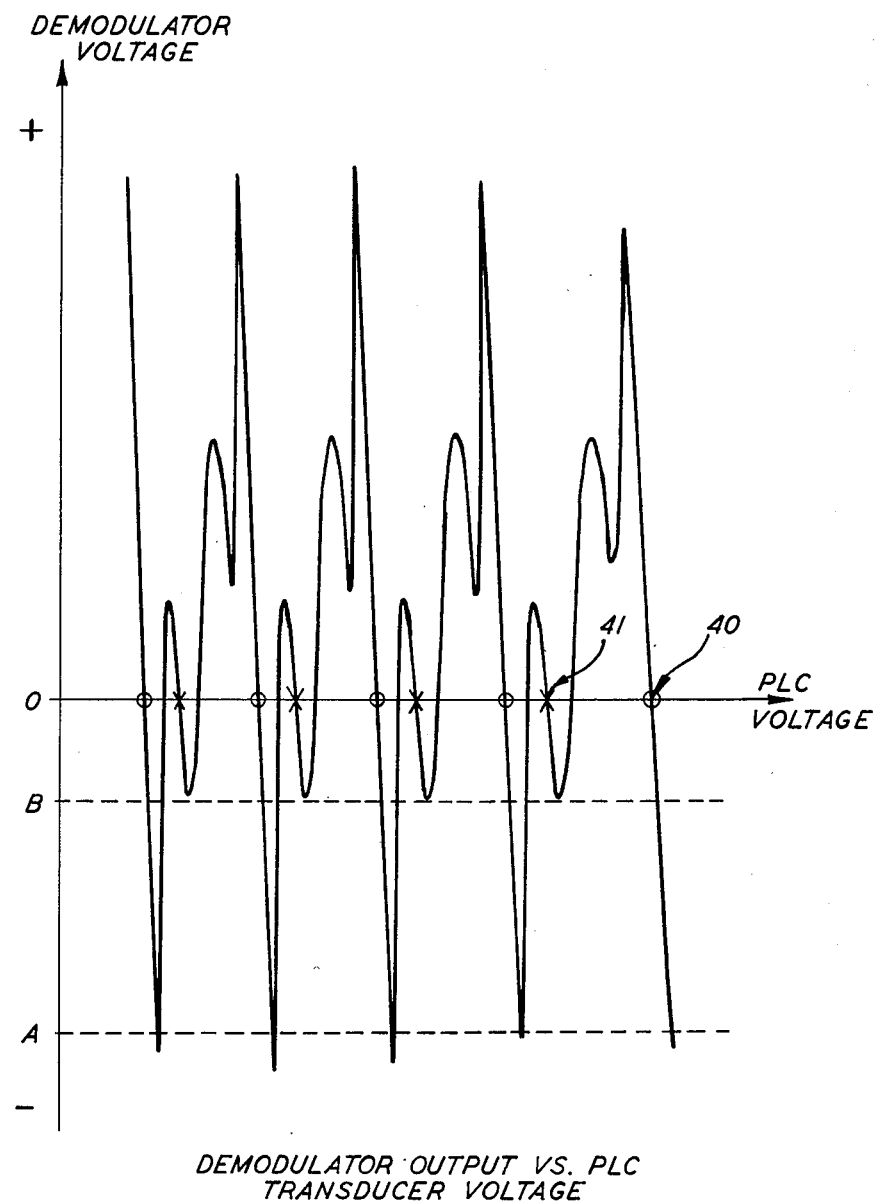
FIG. 2 is a curve illustrating the output of the demodulator of the circuit of FIG. 1 as a function of the voltage applied to the transducer of FIG. 1.

Referring to FIG. 2 which shows the demodulator output as a function of the pathlength control loop voltage, i.e. the voltage out of amplifier 15, it is again noted that operation at one of the points 40 is desirable. The bias voltage obtained from the circuit comprising the voltage source coupled to terminal 53, the resistor 51 and capacitor 52, upon turn on of the instrument, creates a bias which is indicated by the dotted line marked A on FIG. 2. An examination of FIG. 2 will show that this dotted line biases the integrator below the peaks caused by operation with two equal longitudinal modes and thus lock-in at a zero cross-over can only occur due to operation at one of the desired single longitudinal modes corresponding to the center of the gain curve. Such is the case as long as the bias voltage does not become smaller than the value indicated by dotted line B on FIG. 2. Thus, the voltage applied to terminal 53 and the capacitor 52 and resistor 51 are selected such that, due to the time constant of the circuit made up of the resistor 51 and capacitor 52 and the voltage applied to terminal 53, the capacitor will not charge past the voltage indicated as B on FIG. 2 before lock-in of the ring laser gyroscope.

With this arrangement it is apparent that the bias is only effective during turn on. This system is such that, upon turning on, voltage is applied to all system components at the same time. Thus, initially, the bias voltage A appears. The ring laser gyroscope begins operation and the capacitor 52 begins charging and the charging current will eventually approach zero. However, before it reaches the voltage indicated by the line B on FIG. 2 the gyroscope will have had time to lock-on to the center of the gain curve where operation with a single longitudinal mode occurs. After an additional period of time the bias voltage will become zero and operation as in the prior art will continue with the servo loop maintaining the proper pathlength despite any changes in temperature or other factors causing minor variations in pathlength.

What is claimed is:

1. In a ring laser gyroscope path loop servo control system in which an oscillation of the laser beam is brought about by vibrating a flexible mirror and the amplitude modulation resulting therefrom detected and demodulated and used to control an integrator which in turn provides a control signal which controls the position of the flexible mirror to maintain the proper pathlength, a method of avoiding starting the ring laser gyroscope at a point where it operates with two equal longitudinal modes comprising, automatically applying to the integrator a bias voltage only during start-up which biases the integrator to a voltage at which lock-in to the point where two equal longitudinal modes exist is not possible,
    wherein said step of applying a bias comprises applying a voltage, at start-up, through a capacitor and resistor in series to the input of the said integrator, whereby said bias will exist only during start-up and further including the step of selecting the voltage applied and the time constant of the resistor and capacitor circuit such that a bias voltage sufficient to prevent lock-in where two longitudinal modes exist for a time period at least as great as that required for the gyroscope to lock-in is provided.

* * * * *